(12) United States Patent
Yin

(10) Patent No.: US 10,116,626 B2
(45) Date of Patent: *Oct. 30, 2018

(54) CLOUD BASED LOGGING SERVICE

(71) Applicant: Fortinet, Inc., Sunnyvale, CA (US)

(72) Inventor: Jun Yin, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,805

(22) Filed: Dec. 22, 2017

(65) Prior Publication Data
US 2018/0124021 A1 May 3, 2018

Related U.S. Application Data

(63) Continuation of application No. 15/236,455, filed on Aug. 14, 2016, now Pat. No. 9,853,944, which is a
(Continued)

(51) Int. Cl.
*G06F 21/62* (2013.01)
*H04L 29/06* (2006.01)
(Continued)

(52) U.S. Cl.
CPC ...... *H04L 63/0281* (2013.01); *G06F 11/1471* (2013.01); *G06F 11/3476* (2013.01); *G06F 21/62* (2013.01); *H04L 41/22* (2013.01); *H04L 43/04* (2013.01); *H04L 63/02* (2013.01); *H04L 63/0254* (2013.01); *H04L 63/0272* (2013.01); *H04L 63/1408* (2013.01); *H04L 63/1416* (2013.01); *H04L 63/1425* (2013.01);
(Continued)

(58) Field of Classification Search
CPC ... G06F 21/62; G06F 11/1471; G06F 11/3476
See application file for complete search history.

(56) References Cited

U.S. PATENT DOCUMENTS 5,473,599 A 12/1995 Li et al.
5,826,000 A 10/1998 Hamilton
(Continued)

OTHER PUBLICATIONS

Marty, "Cloud Application Logging for Forensics", pp. 178-184 (Year: 2011).*
(Continued)

*Primary Examiner* — Thaddeus J Plecha
(74) *Attorney, Agent, or Firm* — Hamilton, DeSanctis & Cha LLP

(57) ABSTRACT

Methods and systems are provided for facilitating access to a cloud-based logging service. According to one embodiment, access to a cloud-based logging service is integrated within a network security appliance by automatically configuring access settings for the logging service and creating an account for the security appliance with the logging service. A log is created within the logging service by making use of the automatically configured access settings and the account. A request is received by the security appliance to access data associated with the log. Responsive thereto and without requiring separate registration of a network administrator with the cloud-based logging service, the data is retrieved by the security appliance from the logging service and is presented via a graphical user interface of the security appliance.

20 Claims, 7 Drawing Sheets

Related U.S. Application Data continuation of application No. 15/066,632, filed on Mar. 10, 2016, now Pat. No. 9,521,159, which is a continuation of application No. 14/938,598, filed on Nov. 11, 2015, now Pat. No. 9,294,494, which is a continuation of application No. 14/636,535, filed on Mar. 3, 2015, now Pat. No. 9,197,521, which is a continuation of application No. 13/910,968, filed on Jun. 5, 2013, now Pat. No. 9,049,173.

(51) Int. Cl.
  *G06F 11/34*   (2006.01)
  *G06F 11/14*   (2006.01)
  *H04L 12/26*   (2006.01)
  *H04L 29/08*   (2006.01)
  *H04L 12/24*   (2006.01)

(52) U.S. Cl.
  CPC .......... *H04L 67/10* (2013.01); *H04L 67/1097* (2013.01); *H05K 999/00* (2013.01)

(56) References Cited

U.S. PATENT DOCUMENTS

| | | |
|---|---|---|
| 6,360,264 B1 | 3/2002 | Rom |
| 6,615,166 B1 | 9/2003 | Guheen et al. |
| 7,607,092 B2 | 10/2009 | Rogers et al. |
| 7,640,348 B2 | 12/2009 | Atwal et al. |
| 7,752,329 B1 | 7/2010 | Meenan et al. |
| 7,827,605 B2 | 11/2010 | Lyle et al. |
| 9,002,932 B2 | 4/2015 | Wang |
| 9,049,173 B2 | 6/2015 | Yin |
| 9,122,841 B2 | 9/2015 | Pavlov et al. |
| 9,197,521 B2 | 11/2015 | Yin |
| 9,224,003 B2 | 12/2015 | Andersen et al. |
| 9,294,494 B1 | 3/2016 | Yin |
| 9,521,159 B2 | 12/2016 | Yin |
| 9,781,187 B2 | 10/2017 | Meiners et al. |
| 9,853,944 B2 | 12/2017 | Yin |
| 2002/0198983 A1 | 12/2002 | Ullmann et al. |
| 2003/0061404 A1 | 3/2003 | Atwal et al. |
| 2005/0050048 A1 | 3/2005 | Perez |
| 2005/0262556 A1 | 11/2005 | Waisman et al. |
| 2006/0038660 A1 | 2/2006 | Doumuki et al. |
| 2006/0155982 A1 | 7/2006 | Christensen et al. |
| 2007/0277110 A1 | 11/2007 | Rogers et al. |
| 2009/0064331 A1 | 3/2009 | Lyle et al. |
| 2010/0022240 A1 | 1/2010 | Skinner |
| 2010/0027552 A1 | 2/2010 | Hill |
| 2010/0281146 A1 | 11/2010 | Lee |
| 2012/0209886 A1* | 8/2012 | Henderson ........ G06F 17/30557 707/798 |
| 2013/0080509 A1 | 3/2013 | Wang |
| 2013/0198141 A1 | 8/2013 | Khan et al. |
| 2013/0290548 A1 | 10/2013 | He |
| 2014/0090020 A1 | 3/2014 | Meiners et al. |
| 2014/0109188 A1 | 4/2014 | Pavlov et al. |
| 2014/0359552 A1 | 12/2014 | Misra et al. |
| 2014/0366118 A1 | 12/2014 | Yin |
| 2015/0113279 A1 | 4/2015 | Andersen et al. |
| 2015/0188784 A1 | 7/2015 | Yin |
| 2015/0347264 A1 | 12/2015 | Mohammed et al. |
| 2016/0065606 A1 | 3/2016 | Yin |
| 2016/0191562 A1 | 6/2016 | Yin |
| 2016/0366101 A1 | 12/2016 | Yin |

OTHER PUBLICATIONS

Ray et al., "Secure Logging as a Service—Delegating Log Management to the Cloud", pp. 323-334 (Year: 2013).*
Non-Final Rejection for U.S. Appl. No. 13/910,968 dated Oct. 1, 2014.
Notice of Allowance for U.S. Appl. No. 13/910,968 dated Apr. 24, 2015.
Xie et al., "A Tiered Strategy for Auditing in the Cloud." 2012, 2 pgs.
Notice of Allowance for U.S. App. No. 14/636,535 dated Oct. 2, 2015.
Marty, "Cloud Application Loggin for Forensics." 2011, pp. 178-184.
Non-Final Rejection for U.S. Appl. No. 14/636,535 dated May 21, 2015.
Notice of Allowance for U.S. Appl. No. 14/938,598 dated Feb. 10, 2016.
Yu et al., "Mass Log Data Processing and Mining Based on Hadoop and Cloud Computing." Jul. 2012. pp. 197-202.
Non-Final Rejection for U.S. Appl. No. 15/066,632 dated Jun. 17, 2016.
Zawoad et al. "SecLaaS: Secure Logging-as-a-Service for Cloud Forensics." 2013, pp. 219-230.
Notice of Allowance for U.S. Appl. No. 15/236,455 dated Sep. 12, 2017.
Notice of Allowance for U.S. Appl. No. 15/236,455 dated Oct. 6, 2016.
Notice of Allowance for U.S. Appl. No. 15/066,632 dated Oct. 28, 2016.
Yang et al., "Data storage auditing service in cloud computing: challenges, methods and opportunities", Jul. 2011, pp. 409-428.
Park et al., "Near-Realt-Time Cloud Auditing for Rapid Response", 2012, pp. 1252-1257.

* cited by examiner

CLOUD BASED LOGGING SERVICE

CROSS-REFERENCE TO RELATED APPLICATIONS

This application is a continuation of U.S. patent application Ser. No. 15/236,455, filed on Aug. 14, 2016, now U.S. Pat. No. 9,853,944, which is a continuation of U.S. patent application Ser. No. 15/066,632, filed on Mar. 10, 2016, now U.S. Pat. No. 9,521,159, which is a continuation of U.S. patent application Ser. No. 14/938,598, filed on Nov. 11, 2015, now U.S. Pat. No. 9,294,494, which is a continuation of U.S. patent application Ser. No. 14/636,535, filed on Mar. 3, 2015, now U.S. Pat. No. 9,197,521, which is a continuation of U.S. patent application Ser. No. 13/910,968 filed on Jun. 5, 2013, now U.S. Pat. No. 9,049,173, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2017, Fortinet, Inc.

BACKGROUND

Field

Embodiments of the present invention generally relate to the field of computer networks. In particular, various embodiments relate to methods and systems for accessing cloud-based logging service without requiring user registration to simplify user access, for example.

Description of the Related Art

Computer networks used by large business enterprises generally consist of a network of networks spread over geographical regions ranging from different buildings to different continents. Each individual network may contain various network appliances such as routers, switches, gateways, firewalls, Wireless Access Points, and can also be considered to include general purpose computing devices such as personal computers, PDA's, laptops, printers, among others. Among other functions, network appliances typically facilitate communication and exchange of content/information among local general purpose computing devices and with other remote general purpose computing devices that may be spread over geographical regions.

Over time, individual users, Information Technology (IT) professionals, and business enterprises have increasingly utilized network solutions to increase capacity and efficiency of their business processes. IT professionals and business personnel have elected to use cloud-based services to host their applications and access them through Internet. With the number of users of cloud-based services increasing by the day, the complexity of network solutions has also increased and so has the threat to computing devices and content stored/accessible therein. Accordingly, business enterprises are increasingly looking towards safer and more efficient network solutions that meet their data integration and security needs.

In business enterprises, computer network activities, events and/or communications can be logged, analyzed and reported by network analysis appliances. Such activities, events and communications, include, but are not limited to, the content of one or more packets, network status, quality of service, security events, network threats, web content and messaging data. Logs and/or reports can be generated by existing network security gateway appliances that form part of a given network. Authorized users, such as network administrators, can generate customized reports using the logs and analyze the reports for further necessary and desired actions.

To make network analysis appliances more cost effective, it would be useful to maintain event logs and/or traffic logs within a cloud-based service. To make such a cloud-based logging service more enticing, it would be useful to automate the activation of the cloud-based logging service by integrating the cloud-based logging service within the graphical user interface of network security gateway appliances.

SUMMARY

Methods and systems are provided for enabling efficient user access to cloud-based logging service without requiring user registration, thereby simplifying user access, for example. According to one embodiment, a network security gateway is provided having one or more microprocessors and one or more internal data storage devices operatively coupled to the one or more microprocessors and having stored therein a graphical user interface module and a cloud-based logging service access module. The graphical user interface module allows a network administrator to view and modify various configuration settings for the network security gateway. A configuration screen associated with logging and reporting settings has integrated therein one or more settings associated with a cloud-based logging service. By default, a setting of the one or more settings associated with logging and archiving of information regarding one or more of network traffic, system events and security events observed by the network security gateway causes the network security gateway to use the cloud-based logging service as a logging device for storage and retrieval of the information. The cloud-based logging service access module automatically creates an account within the cloud-based logging service by registering the network security gateway itself as a user of the cloud-based logging service, thereby allowing the network security gateway to make use of the cloud-based logging service for purposes of logging and reporting the information without requiring separate registration with the cloud-based logging service to be performed by the network administrator.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
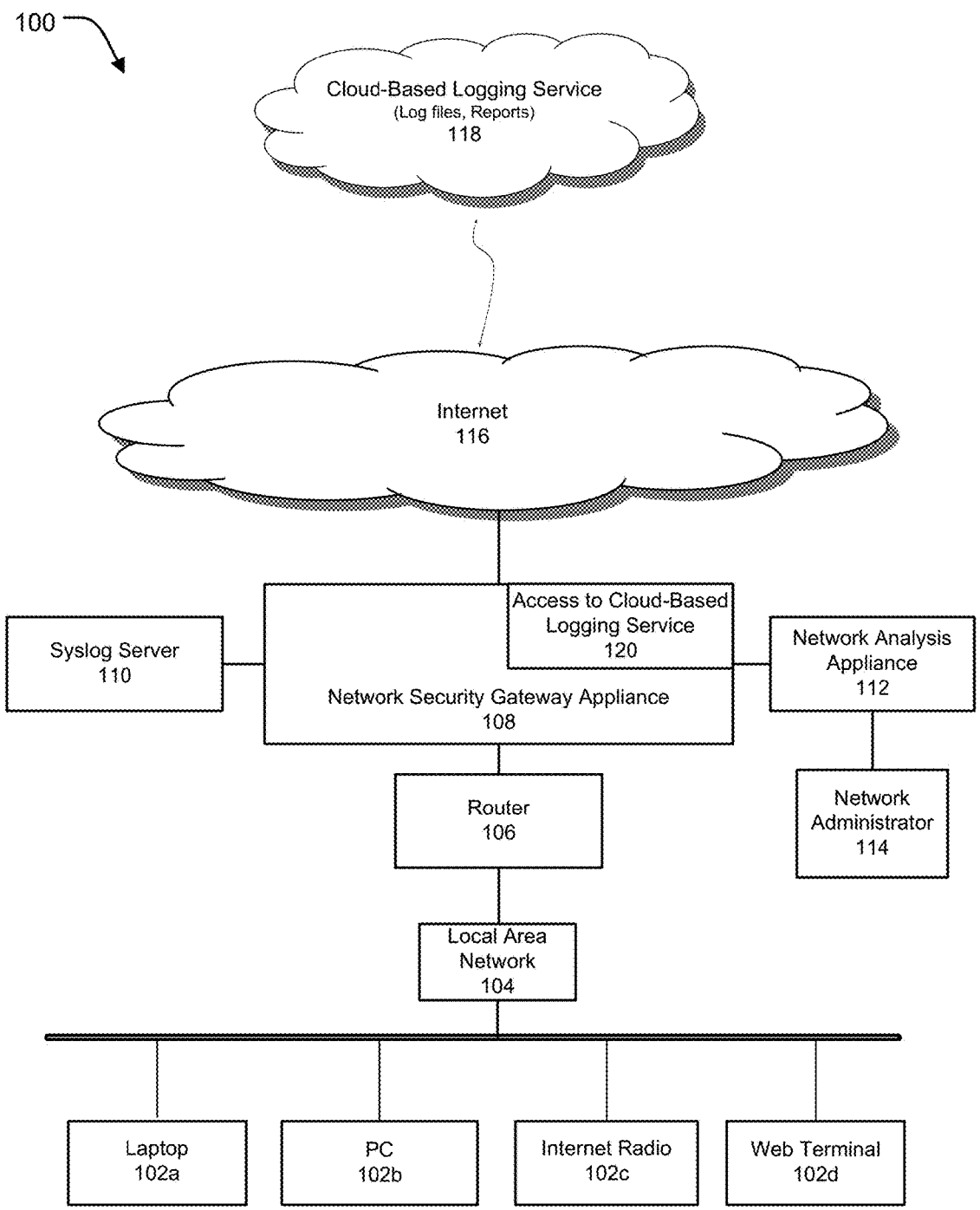
FIG. 1 illustrates a cloud-based logging system in accordance with an embodiment of the present invention.

Embodiments of the present invention generally relate to methods and systems for enabling efficient user access to cloud-based logging service without requiring user registration, thereby simplifying user access, for example. Embodiments of the present invention also relate to methods and systems for providing cloud-based logging service to users by integrating the cloud-based service within a network security gateway appliance, thereby enabling the users to use the cloud-based logging service by accessing the gateway appliance. According to one embodiment, cloud-based logging service can be accessed as an Application Programming Interface (API) from network security gateway appliance, without requiring user registration, which allows easy and efficient access to log files, viewing of log files, and data security to stored log files and generated reports. Embodiments of the present invention also relates to methods and systems used for multiple other purposes apart from allowing access to cloud-based logging service without requiring user registration including, but not limited to, reducing complexity of network architecture, better and effective GUI representation, better accessibility of logging and allied services, and minimizing distribution of data over network, among other such purposes.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of cloud-based logging service without user registration, it should be appreciated that the same has been done merely to illustrate the invention in an exemplary manner and any other purpose or function for which the explained structure or configuration can be used, is covered within the scope of the present disclosure.

It should be appreciated that terms "cloud-based logging service", "cloud logging service", and "cloud-based service" indicate one or more logging services provided at a cloud and accessible either directly or through an appropriate network appliance, and hence these terms are used interchangeably in the present description without departing away from the scope of the invention.

Embodiments of present disclosure and their advantages can be understood by reference to FIG. 1. FIG. 1 illustrates exemplary network architecture 100 for a cloud-based logging service in accordance with an embodiment of the present invention. In the present example, architecture 100 showing access to cloud-based logging service includes a simplified network environment of a typical business organization coupled to the cloud-based logging service 118 via a network, such as the Internet 116. According to one embodiment, network architecture 100, as illustrated in FIG. 1, comprises one or more computing devices such as laptop 102a, PC 102b, Internet radio 102c, and web terminal 102d, collectively referred to as computing devices 102 hereinafter, wherein the computing devices 102 are accessed by one or more users for transaction of data. Computing devices 102 can be connected to each other over a local area network (LAN) 104, which can further be connected to a router 106, wherein the router 106 controls data packets entering and leaving LAN 104.

According to one embodiment, router 106 is operatively coupled with a network security gateway appliance 108, wherein the gateway appliance 108 can be configured to integrate a range of security and monitoring technologies and provide features such as, but not limited to firewall, IPS, application control, threat monitoring, VPN, web content filtering, and the like. According to another embodiment, a syslog server 110 and a network analysis appliance 112 (also interchangeably referred to as network system analysis appliance 112 or network security analysis appliance 112) are operatively coupled with network security gateway appliance 108, wherein syslog server 110 is configured to locally store log data of a particular organization or a part thereof. Network security analysis appliance 112, on the other hand, can be controlled by network administrator 114 and be configured to access logs, store logs, analyze logs, and periodically/on-demand generate customized reports for the accessed logs. Network security gateway appliance 108 can be connected to Internet 116. A cloud-based logging service 118 can be connected to Internet 116 to receive network data from gateway appliance 108 or other suitably configured means, and store the data in the form of log files to enable authorized users of one or more enterprises to access log files and generate desired reports for taking appropriate measures. In addition, logs can also be stored in any or a combination of memory of network security gateway appliance 108, local hard disk of computing devices 102, a separate SQL database, netIQ web trends server, among other compatible options.

Cloud-based logging service 118 can be hosted on a cloud server and is generally an optional service offered to a user, such as network administrator 114. Such an optional service may provide the enterprise employing network security gateway appliance 108 with cost-advantages as it can eliminate the requirement of other dedicated hardware, such as network analysis appliance 112 and/or syslog server 110. Furthermore, in some embodiment, cloud-based logging service 118 may allow authorized users to access the service 118 from outside of the controlled network, thereby providing users with additional flexibility to view log files and generate reports of interest as long as they have Internet access.

According to one embodiment, network security gateway appliance 108 enables access to cloud-based logging service 118 by means of an interface 120 configured within a graphical user interface (GUI) of network security gateway appliance 108. Interface 120, also referred to as access to cloud-based logging service 120, can be implemented as one or more command line interface (CLI) commands, one or more HyperText Transfer Protocol (HTTP) links, one or more check boxes, one or more radio buttons, one or more drop down lists, one or more text entry fields, one or more scrolled list boxes, one or more menu bars, one or more widgets or any combination of the foregoing or other conventional or future human-computer interface mechanisms, including, but not limited to text-based, graphics-based, gesture-controlled and voice-controlled user interface mechanisms.

In one embodiment, when access is enabled to cloud-based logging service 118, cloud-based logging service 118 is treated by network security gateway appliance as a logging device, thereby allowing transparent logging and retrieval of log files having information regarding network level activities, events and communications including, but are not limited to, content of one or more packets, network status, quality of service, security events, network threats, web content and messaging data. Architecture 100 therefore allows a user to directly access cloud-based logging service 118 using graphical interface 120 present on network security gateway appliance 108 and request for desired log files and receive requested files directly on the interface 120 of network security gateway appliance 108.

According to one embodiment, an application programming interface (API) of cloud-based logging service 118 is implemented within network security gateway appliance 108 and can be executed through access to cloud-based logging service 120. As APIs of cloud-based logging service 118 can be integrated and implemented within network security gateway appliance 108, registration of network security gateway appliance 108 itself obviates the need for user registration with the cloud-based logging service 118, thereby eliminating any further need for user registration, authorization, or account activation for accessing the cloud-based service 118 for viewing log files and generating reports.

According to one embodiment, a user or network administrator can access a graphical interface of network security gateway appliance 108 through one or more computing devices 102 for extracting/viewing and analyzing log files, checking data security, generating reports, and performing like functions by using access to cloud-based logging service 120, which is configured on the interface of appliance 108. In one implementation, a user can send a request to cloud-based logging service 118 from a computing device 102, wherein the request can be received at local area network 104 and then transmitted to router 106. Router 106 receives the request and identifies computing device 102 from which the request has been received and using access control/routing protocols, transmits the request further to network security gateway appliance 108. Network security gateway appliance 108 identifies that the received request is for cloud-based logging service 118 and accordingly executes application program interface (API) through access to cloud-based logging service 120 for the received request and accesses service 118 to retrieve desired logs and/or reports. Retrieved log files and/or reports can be outputted as response to received request on graphical user interface of network security gateway appliance 108.

According to one embodiment, network security gateway appliance 108 can include one or more processors (not shown) for processing requests received by users for particular services such as viewing log files, firewall configuration and implementation, IPS, application control, VPN, web content filtering configured to provide network security, and other like services. Network appliance 108 can further be configured to evaluate the extent of which the network under consideration is secure from network threats, content threats, and application-level threats. Network security gateway appliance can further include a communication interface device (not shown) for receiving requests from users/network administrators and transmitting responses to received requests back to the users/network administrators. Further, network security gateway appliance 108 can include one or more internal data storage devices or memory coupled to one or more processors that can store data processed and managed by processors and network settings of network security gateway appliance 108. Memory of network security appliance 108 can further be configured to store log files retrieved from cloud-based logging service 118.

It should be appreciated that architecture 100 of the present invention is merely an exemplary illustration and only for explanation of the proposed architecture. Any change in configuration such as replacement of router 106 by an appropriate switch, hub, or any other gateway device is completely within the scope of the present disclosure. Furthermore, syslog server 110 and network analysis appliance 112 can be suitably incorporated, configured, or removed from a given network architecture. Similarly, any addition of one or more network appliances or change in architecture of the proposed system is completely within the scope of the present invention. For instance, instead of a graphical interface 120 on gateway appliance 108, a command line interface can also be provided on the appliance 108 so as to access cloud-based logging service 118 of the present invention.

Network security appliance 108 can include one or more of gateways, network hardware appliances, application-level threat detectors, or other such systems that allow enterprise-class protection against network, content, and application-level threats, among allied functions. According to one embodiment, memory of network security gateway appliance can store multiple modules, which when executed, can facilitate interaction with cloud-based logging service as have been illustrated and described below in FIG. 2.

Figure 2:
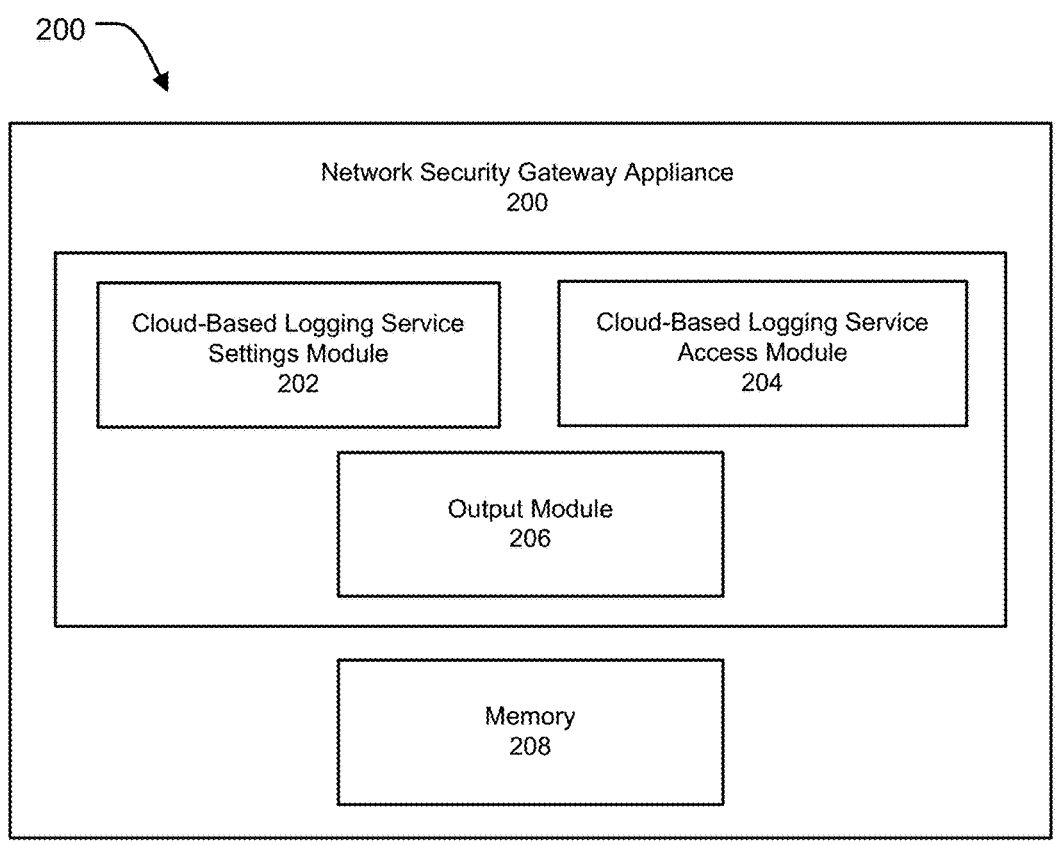
FIG. 2 illustrates exemplary functional units of a network security gateway appliance configured to facilitate interactions with a cloud logging service in accordance with an embodiment of the present invention.

FIG. 2 illustrates exemplary functional units of a network security gateway appliance 200 configured to facilitate interactions with a cloud-based logging service in accordance with an embodiment of the present invention. Network security gateway appliance 200, also referred to as network appliance or network security appliance 200, comprises a cloud-based logging service settings module 202, a cloud-based logging service access module 204, and an output module 206. According to one embodiment, cloud-based logging service settings module 202, also referred to as settings module 202 hereinafter, is configured to integrate cloud-based logging service with network appliance 200, and customize settings and configurations by means of which the cloud-based logging service would be accessible to users/network administrators through the network appliance 200. Integrating and customizing settings for access to cloud-based logging service on network security gateway appliance 200 allows a means to access cloud-based logging service on interface/graphical user interface of network security gateway appliance 200. Cloud-based logging service settings module 202 can further be configured to enable configuration of settings for cloud-based logging service, wherein cloud-based logging service can be provided to users based on set configuration settings. Cloud-based logging service settings module 202 can further enable storing of configured settings for future reference and change in access policies.

According to one embodiment, settings module 202 further enables integration of cloud-based logging service with network security gateway appliance 200 and implementation of an interface in the appliance 200 by means of a button, link, tag, or any other accessible means, which when clicked/executed enables a user to access cloud-based logging service on the interface of network security gateway appliance 200. According to another embodiment, an application programming interface (API) of cloud-based logging service can be implemented in network security gateway appliance 200 as part of configuration of the cloud-based logging service settings, wherein the interface/GUI of the network security gateway appliance 200 enables invoking of the API upon receiving an appropriate request from a user for access to network logging data.

According to one embodiment, cloud-based logging service settings module 202 can be configured to customize network security gateway appliance 200 so as to automatically provide requested network logging data to user once a request is given by the user through the interface built on the appliance 200. According to another embodiment, cloud-based logging service settings can be customized manually to provide requested network logging data. Settings configured for access to cloud-based logging service can include status information indicating whether automatic cloud-based logging service is enabled or disabled, format of network logging data to be displayed, logging duration, security level settings, access rights to other users, frequency of generating network logging data for cloud-based logging services, among other such setting parameters.

According to one embodiment, settings module 202 is configured such that cloud-based logging service is enabled by default. In an instance, cloud-based logging service can be enabled by default for devices that do not have a separate network security analysis appliance. According to another embodiment, settings module 202 is configured such that cloud-based logging service is disabled by default and interface for access to cloud-based logging service is only presented/displayed on network security gateway appliance 200 when the cloud-based logging service is explicitly enabled by a user using the settings module 202.

According to one embodiment, cloud-based logging service access module 204 can be configured to receive a request from a user for accessing cloud-based logging service and fetching network logging data based on the received request and parameters defined therein. Log request received from a user can include multiple parameters such as devices for which logged content is to be retrieved, preferred fields presented in the log, duration for which the log is to be retrieved, among other parameters. Based on the received request, network appliance 200, through the cloud-based logging service interface incorporated therein, accesses the cloud-based logging service and retrieves relevant log files. One or more APIs customized and integrated into network appliance 200 by cloud-based logging service settings module 202 can be used by appliance 200 to extract and present the relevant log files.

According to one embodiment, upon receiving a request for viewing network logging data using cloud-based logging service from a user, one or more APIs integrating network security gateway appliance 200 and cloud-based logging service can be invoked and executed. Upon execution of APIs for cloud-based logging service, data pertaining to requested network logging data can be fetched from location where network logging data is stored and presented to the user in a desired report format. Network logging data fetched by network security gateway appliance 200 can include real time log files, downloaded files, schedules, network analysis, configuration status, configuration history, antivirus status, reports generated for log files, other requested files, among such other content.

According to one embodiment, network security gateway appliance 200 can include a command line interface (CLI) for receiving request from a user for providing cloud-based logging service. In such a case, request entered by the user is in the form of commands, and cloud-based logging service access module 204 receives such user entered commands and invokes an appropriate API of cloud-based logging service based on the received request and fetches network logging data to fulfill the received request.

According to one embodiment, output module 206 can be configured to receive network logging data accessed and fetched from cloud-based logging service, and present the received network logging data in an accessible format for further display to user on interface of network security gateway appliance 200. Network logging data, received by output module 206 using cloud-based logging service access module 204, can be in present in an unaligned and unmanaged format, which can then be formatted in a desired and customizable format by the output module 206 before presentation of the final report/formatted data to user. Output module 206 can also be configured to generate one or more reports for content received from cloud-based logging service and transmit the report(s) to user by means of the interface present on network security gateway appliance 200.

Network security gateway appliance 200 can also include memory 208 or a storage device that can store APIs facilitating cloud-based logging service. Memory 208 can also be configured to store network logging data/reports fetched by cloud-based logging service access module 204 for processing by output module 206. Memory 208 can further be configured to store one or more settings defined by the cloud-based logging service settings module 202. According to one embodiment, memory 208 can include one or more of a local disk of network appliance 200, syslog server present as local storage device within an organization, database present at a remote location from network security gateway appliance 200 and operatively coupled via internet, network analysis appliance, any other local storage device such as fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, and the like.

According to one embodiment, network security gateway appliance 200 of the present disclosure is Fortigate and cloud-based logging service is Forticloud, wherein an interface is provided in the GUI of Fortigate, which enables direct access to Forticloud without requiring a user to separately register for Forticloud. Furthermore, Fortianalyzer and/or Fortimanager act as network security analysis appliance, wherein Fortianalyzer is operatively coupled with Fortigate to store and analyze network logs. According to another embodiment, with Forticloud being an independently existing service, a registered user who might not wish to go through the Fortigate and the Forticloud interface implemented therein, can also directly access Forticloud.

According to one embodiment, settings for cloud-based logging service that facilitate implementation of the service on network appliance 200 and enable access to the service, can be integrated and configured within the network security gateway appliance 200 by means of the cloud-based logging service settings module 202, wherein the service can initially be enabled or disabled depending on the user/organization and their preferences. Registration of user for network security gateway appliance can itself be sufficient for accessing the cloud-based logging service and the user does not need to undergo any other authentication or activation procedure in order to access the cloud-based logging service. User present at a remote location can first connect to network security gateway appliance 200 and subsequently gain access to graphical user interface of network security gateway appliance. User can then select access to the cloud-based logging service by selecting the relevant icon on the graphical user interface of the network security gateway appliance and accordingly send a request.

It should be appreciated that the present disclosure allows integrating and customizing a cloud-based logging service within a network security gateway appliance. By integrating and customizing an API of the cloud-based logging service within a network security appliance, a user can directly access the cloud-based logging service through the network security appliance. In embodiments of the present invention, registration, login, authentication and/or activation steps are not required to make immediate use of the cloud-based logging service. As cloud-based logging service can be accessed on graphical user interface of network security gateway appliance, any requirement of additional portals for accessing cloud-based logging service can be eliminated, thereby eliminating need for remembering the URL or domain names for accessing the cloud-based logging service.

Figure 3:
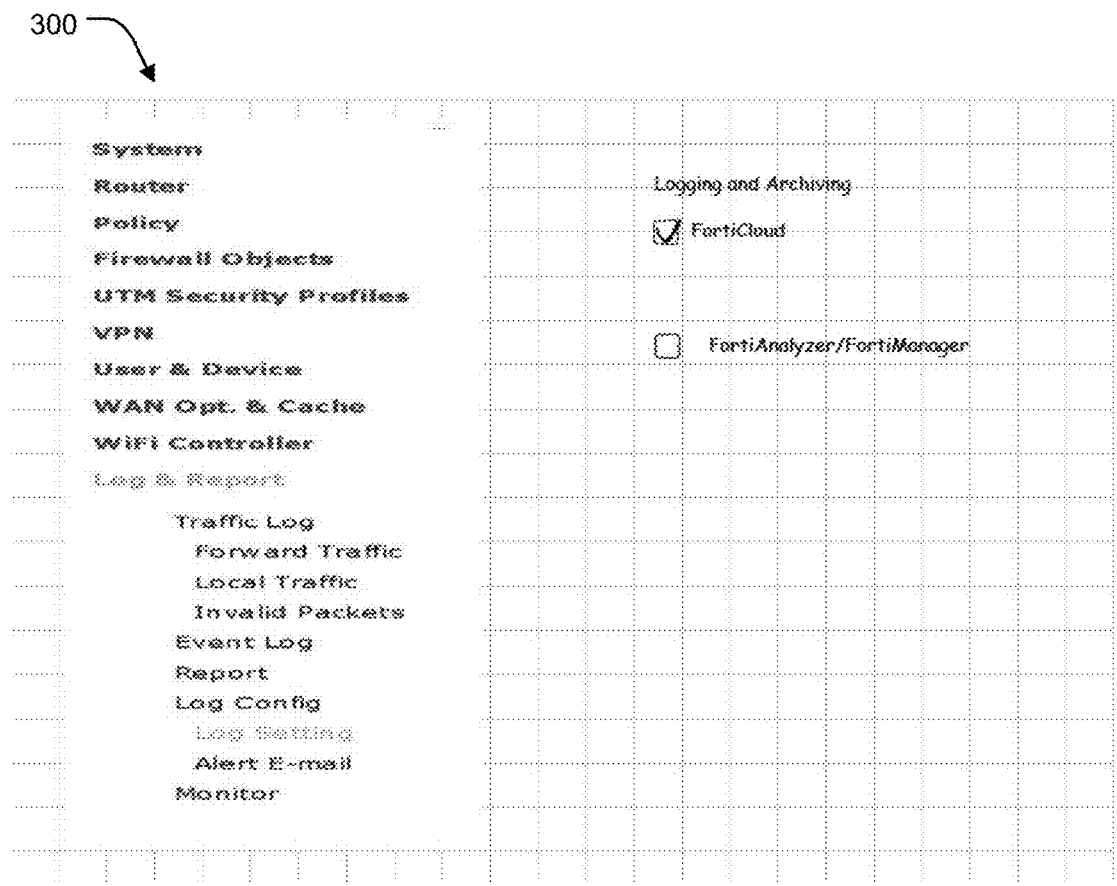
FIG. 3 illustrates exemplary configuration screen of graphical user interface (GUI) of a network security gateway appliance in accordance with an embodiment of the present invention.

FIG. 3 illustrates an exemplary configuration screen 300 of a graphical user interface (GUI) of a network security gateway appliance showing log settings of different logging services in accordance with an embodiment of the present invention. Configuration screen 300 of graphical user interface (GUI) of network security gateway appliance can include one or more settings integrated and customized for working of network security gateway appliance in a desired manner. Settings can include one or more of system policies, router settings, data transfer policies, firewall objects, UTM security profiles, VPN, user and device details, WAN options, WiFi controller settings, log and report settings, among other settings. According to one embodiment, settings on configuration screen 300 of graphical user interface of network security gateway appliance can be displayed in the form of a menu. Alternatively, any other desired format such as pop up menu, pop down menu, scrolling, radio button, select button, hyperlinks to new pages, among other such formats/styles can also be used for enabling configuration of network security appliance.

Logs and reports section shown on configuration screen 300 of network appliance can include settings for logging and reporting of network log data that is requested for by one or more users. Settings defined for such logs and reports can be used to control and manage one or more of traffic log, event log, reporting, log configuration, monitoring, among other attributes of network data logging. According to one embodiment, upon clicking on the log configuration option, setting configurations for integrating and configuring logging services can be displayed, wherein logging services, in an exemplary embodiment, can include cloud-based logging service and network analysis appliance service, both of which enable logging of network data and retrieval of desired log data as and when requested by a user. A network administrator or a user can select either cloud-based logging service, or network analysis appliance service, or both for enabling logging of network data. If the network administrator selects cloud-based logging service (shown as Forticloud in FIG. 3), an interface is displayed on the GUI of security appliance, which, when executed, enables access to log information stored in cloud-based logging service.

According to one embodiment, a configuration option for making use of the cloud-based logging service can be enabled by default and in case network administrator does not wish to use the cloud-based logging service, the administrator can go to log settings option and disable the cloud-based service.

Figure 4:
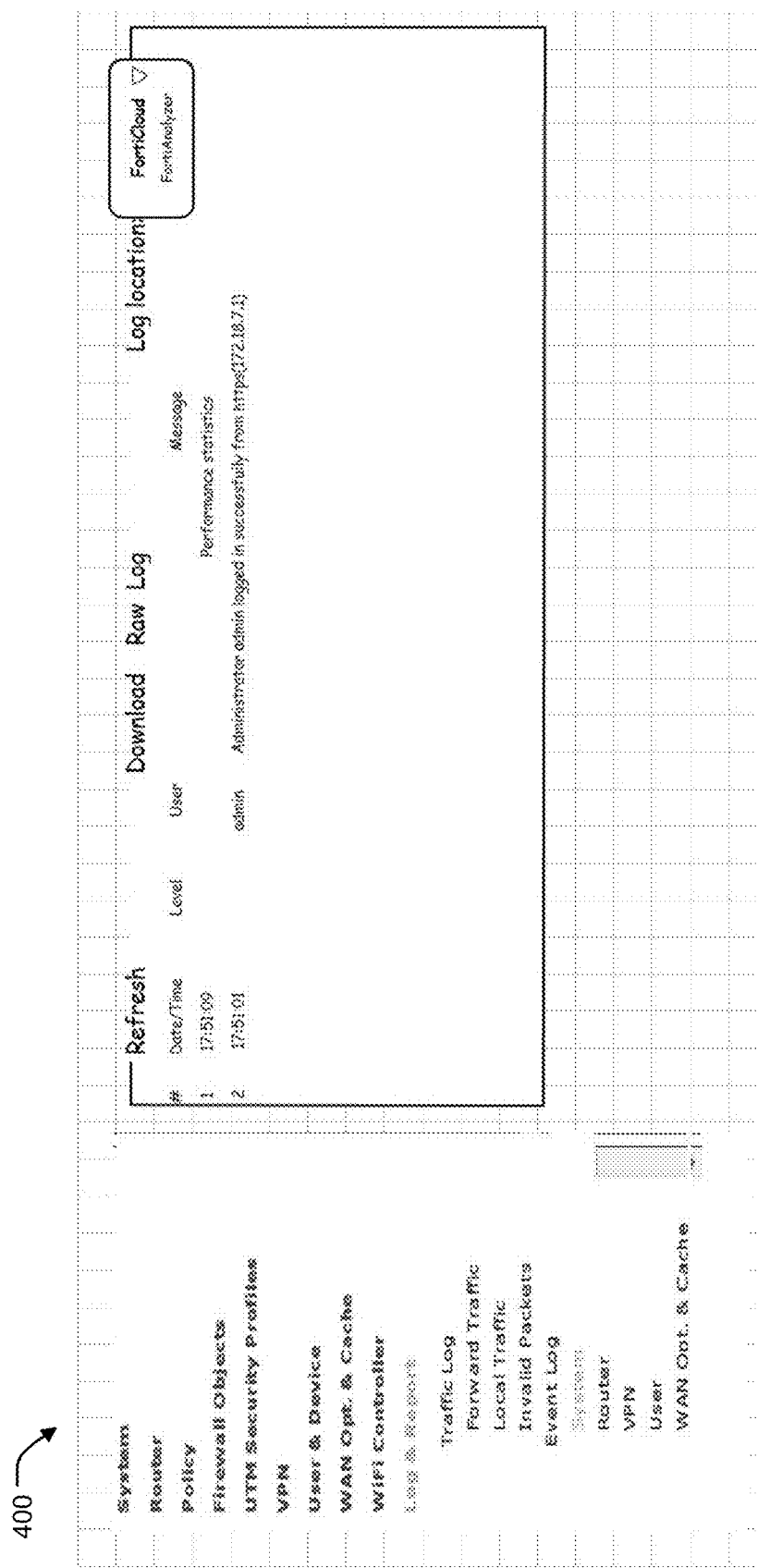
FIG. 4 illustrates a system event log page of GUI of a network security gateway appliance in accordance with an embodiment of the present invention.

FIG. 4 illustrates an exemplary configuration screen 400 showing system event log page of a graphical user interface (GUI) of a network security gateway appliance in accordance with an embodiment of the present invention. According to one embodiment, messages comprising important notifications, alerts, and reminders can be displayed on configuration screen 400 of system event log, wherein notifications, alerts and reminders can be generated based on events invoked and executed by network security gateway appliance. System event log comprises information such as, but not limited to, date and time at which message received, level of threat, access rights to access the message, message subject, among other such information of interest to network administrator or key stakeholders.

According to one embodiment, configuration screen 400 showing system event log can show logs from any of cloud-based logging service, network analysis appliance, and system event log, or a combination thereof based on the settings defined by network administrator. In an embodiment, messages from cloud-based logging service and from network analysis appliance can be displayed on a single screen with an attribute indicating the source of message. In an alternative embodiment, messages from cloud-based logging service and from network analysis appliance can be displayed on different screens, wherein a menu can be configured to enable selection of source of the messages to be displayed. As illustrated in FIG. 4, configuration screen 400 shows the event log page for cloud-based logging service, named as FortiCloud in a pop down menu. Configuration screen 400 comprises of two messages, one with performance statistics received at time 17:51:09 and another describing successful logging in by an administrator from an IP address 172.18.7.1 received at time 17:51:01.

Figure 5:
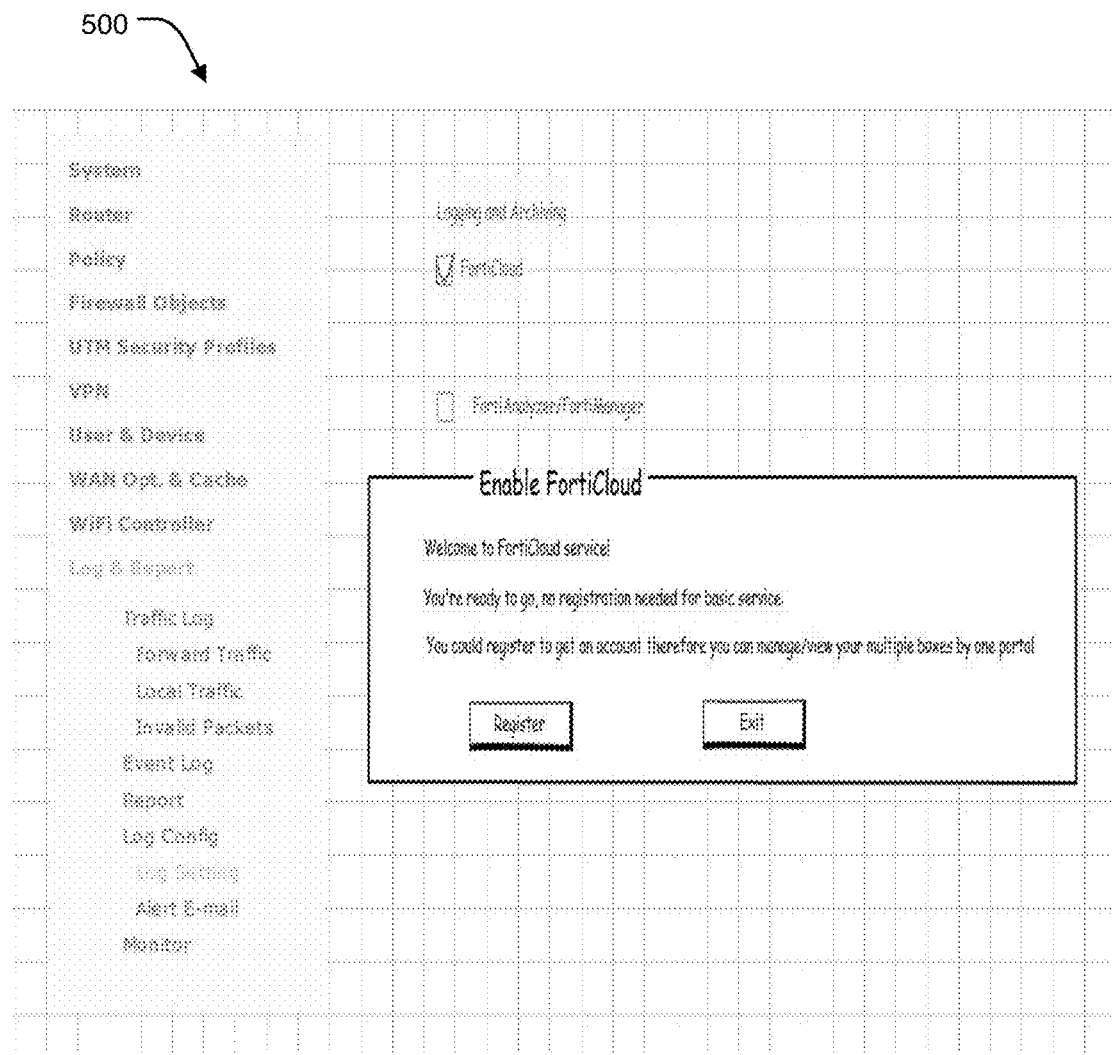
FIG. 5 illustrates a pop-up window of GUI of a network security gateway in accordance with an embodiment of the present invention.

FIG. 5 illustrates an exemplary screen 500 showing pop-up window from the graphical user interface of a network security gateway appliance for enabling cloud-based logging service in accordance with an embodiment of the present invention. Screen 500 displays options for tools to be used for logging and archiving of network data, wherein from the two options of cloud-based logging service (Forticloud) and network analysis appliance (FortiAnalyzer/Fortimanager), when network administrator selects Forticloud, a pop up confirming activation of cloud-based logging service is presented, post which a user can view and manage network data logs.

Figure 6:
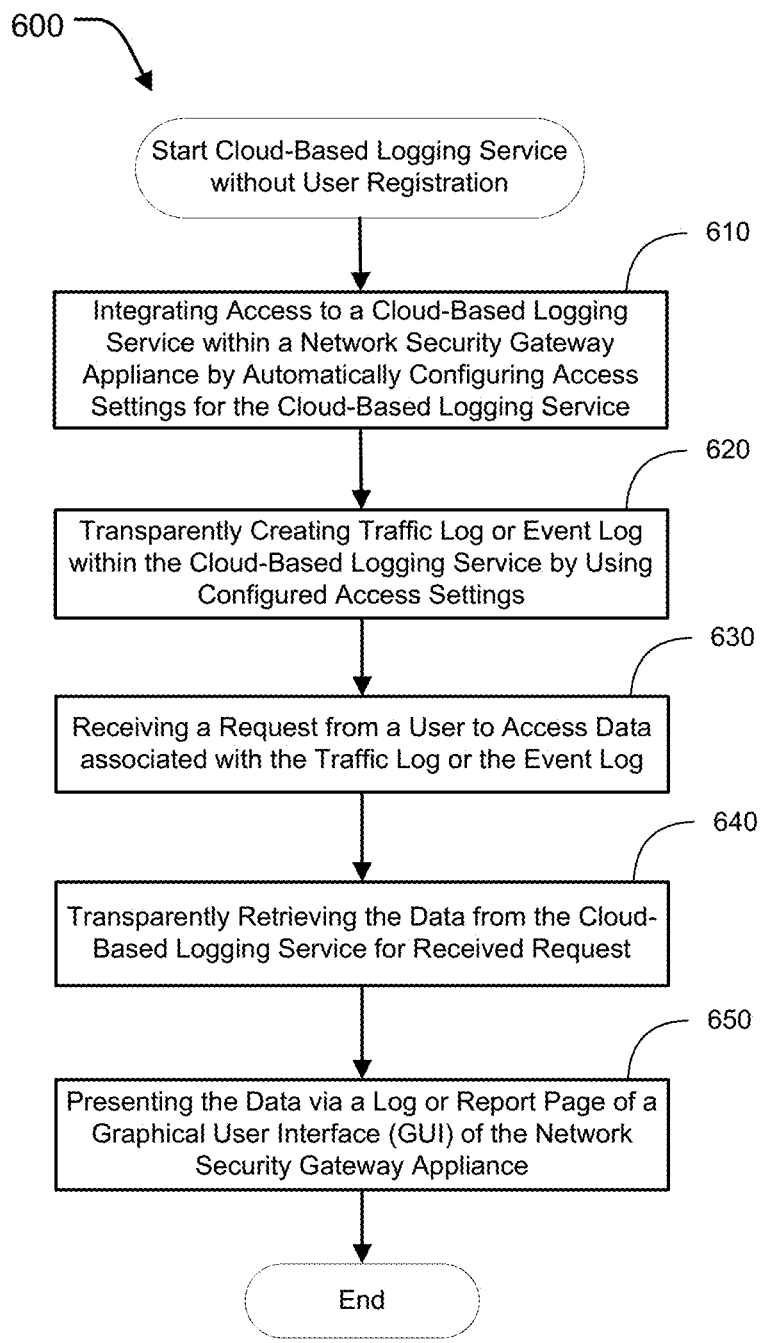
FIG. 6 is a flow diagram illustrating access to and processing of cloud-based logging service in accordance with an embodiment of the present invention.

FIG. 6 is a flow diagram illustrating a method 600 for cloud-based logging service without requiring user registration in accordance with an embodiment of the present invention. Method 600 can also provide cloud-based logging service to user by integrating cloud-based service within a network security gateway appliance, thereby enabling the user to use the cloud-based logging service by accessing the gateway appliance. Method 600 can also provide easy and efficient access to log files, viewing of log files, and data security to stored log files and generated reports. Method 600 of the present invention can also be used for multiple other purposes apart from allowing access to cloud-based service such as reducing complexity of network architecture, better and effective GUI representation, better accessibility of logging and allied services, and minimizing distribution of data over network, among other such purposes.

At block 610, access to cloud-based logging service is integrated within network security gateway appliance by automatically configuring access settings for the cloud-based logging service. Access settings can help configure parameters such as type of access, permissions granted, time of access, storage setting for retrieved logs, among other parameters that help define access mechanism. In an implementation, application programming interfaces (APIs) for cloud-based logging service can be incorporated within the network security gateway appliance, wherein the API of cloud-based logging service can be accessed/called by means of a representation, such as an icon, link, button or the like, presented within a graphical user interface of the gateway appliance. By configuring and integrating cloud-based logging service within an interface of network security gateway appliance, a user can view and access logs of cloud-based logging service through the network security gateway appliance.

As APIs of cloud-based logging service are integrated and configured on interface of network security gateway appliance, cloud-based logging service can be invoked and executed directly, without requiring any user authentication or logging for using cloud-based logging service. User registration, once done for network security gateway appliance can itself suffice the need for accessing cloud-based logging service on interface of network security gateway appliance, thereby reducing authentication and simplifying the logging access process.

At block 620, traffic log or event log for a network, within which the network security gateway appliance resides, can be transparently created within cloud-based logging service. Using automatically configured access settings and treating cloud-based logging service as the logging device, network security gateway appliance can enable creation of network traffic log and system event log for the network at the cloud-based logging service. Network security gateway appliance can be configured to access one or more computing devices present in the residing network and gather incoming and outgoing data for creating network logging data and system event log for the cloud-based logging service.

In an embodiment, network logging data includes real time log files, downloaded files, network content sent or received by computing devices, schedules, network analysis data, configuration status data, configuration history, antivirus status, reports generated based on log files, among other information to be logged. In an embodiment, network security gateway appliance can access and create network logging data and system event log automatically. In an alternative embodiment, network security gateway appliance can access and create network logging data and system event log manually.

At block 630, a request from user to access data associated with traffic log or event log can be received by network security gateway appliance, wherein the request, in an embodiment, can be received at the interface of the network security gateway appliance. The request can include parameters such as devices for which logs are to be retrieved, content to the retrieved from logs, duration for which the logs are to be retrieved, among other desired parameters. When a user requests access of network logging data from cloud-based logging service, the request can be in the form of selection the cloud-based logging service on the interface of the network security gateway appliance.

At block 640, responsive to the request received from user and parameters defined therein, network security gateway appliance can transparently retrieve network data from the cloud-based logging service. In implementation, upon receiving the request from the user for network logging data and system event log, the network security gateway appliance can access and invoke APIs of the cloud-based logging service, wherein the invoked APIs of cloud-based logging service can be executed by network security gateway appliance to identify and fetch requested network logging data and system event log.

At block 650, log data retrieved from cloud-based logging service can be processed, customized, formatted, and presented in the form of a report or log data on the graphical user interface of the network security gateway appliance. According to one embodiment, network data can be retrieved from cloud-based logging service in run-time. According to another embodiment, identified and fetched network logging data and system event logs can be represented in one or more predefined formats and then presented on interface of network security gateway appliance.

According to one embodiment, network logging data and generated reports can be stored in memory of network security gateway appliance and can also be downloaded by users at a future date. In another embodiment, network logging data and generated reports can be sent to a defined e-mail address on a periodic or on-demand basis.

The present method allows integrating and customizing cloud-based logging service on network security gateway appliance. By integrating and customizing APIs of cloud-based logging service on network security appliance, user can directly use network security gateway appliance for access to cloud-based logging service. The proposed method only requires registration for network security gateway appliance, thereby eliminating the need for registration, login, authentication, or activation steps to access the cloud-based logging service. As cloud-based logging service can be accessed on graphical user interface of network security gateway appliance, any requirement of additional portals for accessing cloud-based logging service can be eliminated, thereby negating the need for remembering the URL or domain names for accessing the cloud-based logging service.

Figure 7:
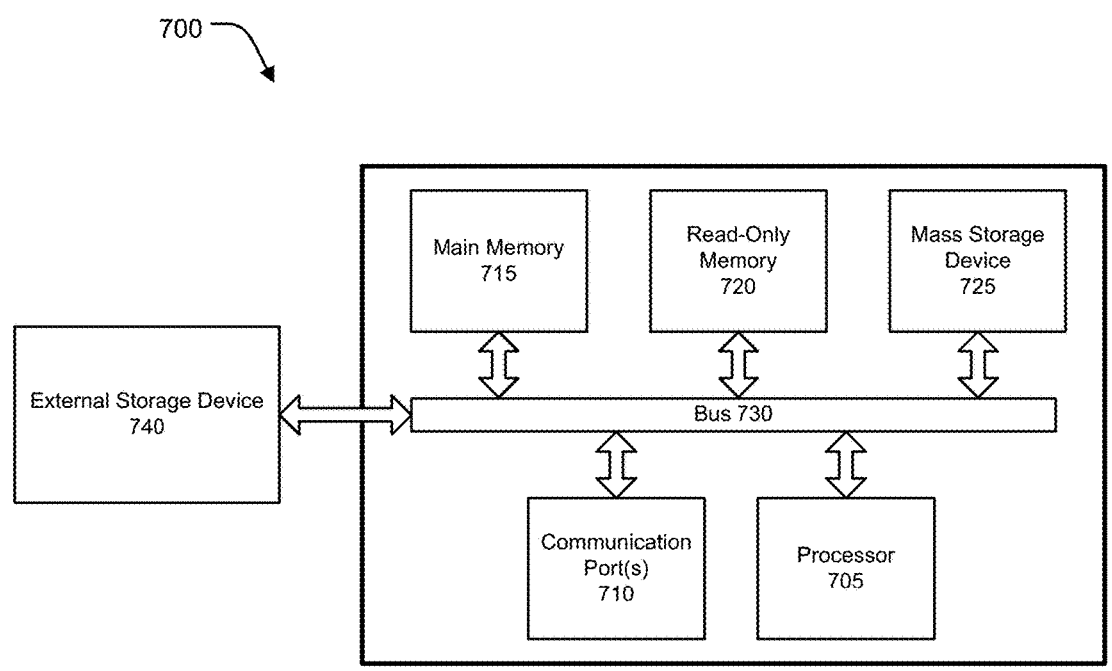
FIG. 7 is an exemplary computer system in which or with which embodiments of the present invention may be utilized.

FIG. 7 is an example of a computer system 700 with which embodiments of the present disclosure may be utilized. Computer system 700 may represent or form a part of a network device (e.g., network security gate appliance 108, syslog server 110 or network analysis appliance), a server, an administrative console or computer system or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Xeon® or Itanium® processor(s), or AMD® Opteron® or Athlon MP® processor(s), Motorola® lines of processors, FortiSOC™ system on a chip processors or other future processors. Processor 705 may include various modules associated with messaging security gateway 200 as described with reference to FIG. 2. For example, processor 705 may include one or more of mail reception module 202, domain name validation module 204, validity update module 206 and send/discard module 208.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
enabling a network administrator of a network security gateway of a private network of an enterprise to view and modify various configuration settings for the network security gateway, wherein a configuration screen associated with logging and reporting settings has integrated therein one or more settings associated with a cloud-based logging service;
causing the network security gateway to use the cloud-based logging service as a logging device for storage and retrieval of information regarding one or more of network traffic, system events and security events observed by the network security gateway by enabling by default, by the network security gateway, a setting of the one or more settings associated with logging and archiving of the information; and
automatically creating, by the network security gateway, an account within the cloud-based logging service by registering the network security gateway itself as a user of the cloud-based logging service, thereby allowing the network security gateway to make use of the cloud-based logging service for purposes of logging and reporting the information without requiring separate registration with the cloud-based logging service to be performed by the network administrator.

2. The method of claim 1, further comprising invoking, by the network security gateway, the cloud-based logging service through an application programming interface (API) of the cloud-based logging service implemented within the network security gateway.

3. The method of claim 1, further comprising providing, by the network security gateway, on behalf of the private network one or more of firewall functionality, Intrusion Prevention System (IPS) functionality, application control functionality, Virtual Private Networking (VPN) functionality and web content filtering functionality.

4. The method of claim 1, wherein the cloud-based logging service is provided by a vendor of the network security gateway.

5. A method comprising:
  causing, by a network security gateway device, protecting a private network of an enterprise, usage of a cloud-based logging service, as a logging device for storage and retrieval of information regarding one or more of network traffic, system events and security events observed by the network security gateway device by:
    integrating access, within the network security gateway device, to the cloud-based logging service;
    enabling, by default, logging and archiving of the information to the cloud-based logging service; and
    providing, without a fee to the enterprise, a basic level of logging and reporting services via the could-based logging service by automatically creating an account within the cloud-based logging service, including registering the network security gateway device itself as a user of the cloud-based logging service;
  creating within the cloud-based logging service, by the network security gateway device, a traffic log or an event log for the private network by making use of the automatically created account;
  receiving, by the network security gateway device, a request from a network administrator to access data associated with the traffic log or the event log; and
  responsive to the request and without requiring separate registration with the cloud-based logging service by the network administrator, retrieving, by the network security gateway device, the data from the account of the cloud-based logging service and presenting the data to the network administrator via a log or report page of a graphical user interface of the network security gateway device.

6. The method of claim 5, further comprising invoking, by the network security gateway device, the cloud-based logging service through an application programming interface (API) of the cloud-based logging service implemented within the network security gateway device.

7. The method of claim 5, further comprising providing, by the network security gateway device, on behalf of the private network one or more of firewall functionality, Intrusion Prevention System (IPS) functionality, application control functionality, Virtual Private Networking (VPN) functionality and web content filtering functionality.

8. The method of claim 5, wherein said enabling, by default, logging and archiving of the information to the cloud-based logging service is responsive to a determination by the network security gateway device that the network security gateway device does not have a local hard disk.

9. The method of claim 5, further comprising prompting the network administrator to register with the cloud-based logging service to obtain enhanced services beyond those of the basic level of logging and reporting services.

10. The method of claim 5, wherein the cloud-based logging service is provided by a vendor of the network security gateway device.

11. A non-transitory computer-readable storage medium embodying a set of instructions, which when executed by one or more processors of a network security gateway of a private network of an enterprise, cause the one or more processors to perform a method comprising:
  enabling a network administrator of the network security gateway to view and modify various configuration settings for the network security gateway, wherein a configuration screen associated with logging and reporting settings has integrated therein one or more settings associated with a cloud-based logging service;
  causing the network security gateway to use the cloud-based logging service as a logging device for storage and retrieval of information regarding one or more of network traffic, system events and security events observed by the network security gateway by enabling by default a setting of the one or more settings associated with logging and archiving of the information; and
  automatically creating an account within the cloud-based logging service by registering the network security gateway itself as a user of the cloud-based logging service, thereby allowing the network security gateway to make use of the cloud-based logging service for purposes of logging and reporting the information without requiring separate registration with the cloud-based logging service to be performed by the network administrator.

12. The non-transitory computer-readable storage medium of claim 11, wherein the method further comprises invoking the cloud-based logging service through an application programming interface (API) of the cloud-based logging service implemented within the network security gateway.

13. The non-transitory computer-readable storage medium of claim 11, wherein the method further comprises providing on behalf of the private network one or more of firewall functionality, Intrusion Prevention System (IPS) functionality, application control functionality, Virtual Private Networking (VPN) functionality and web content filtering functionality.

14. The non-transitory computer-readable storage medium of claim 11, wherein the cloud-based logging service is provided by a vendor of the network security gateway.

15. A non-transitory computer-readable storage medium embodying a set of instructions, which when executed by one or more processors of a network security gateway device, protecting a private network of an enterprise, cause the one or more processors to perform a method comprising:
  causing usage of a cloud-based logging service, as a logging device for storage and retrieval of information regarding one or more of network traffic, system events and security events observed by the network security gateway device by:
    integrating access, within the network security gateway device, to the cloud-based logging service;

enabling, by default, logging and archiving of the information to the cloud-based logging service; and providing, without a fee to the enterprise, a basic level of logging and reporting services via the could-based logging service by automatically creating an account within the cloud-based logging service, including registering the network security gateway device itself as a user of the cloud-based logging service;

creating within the cloud-based logging service, a traffic log or an event log for the private network by making use of the automatically created account;

receiving a request from a network administrator to access data associated with the traffic log or the event log; and responsive to the request and without requiring separate registration with the cloud-based logging service by the network administrator, retrieving the data from the account of the cloud-based logging service and presenting the data to the network administrator via a log or report page of a graphical user interface of the network security gateway device.

16. The non-transitory computer-readable storage medium of claim 15, wherein the method further comprises invoking the cloud-based logging service through an application programming interface (API) of the cloud-based logging service implemented within the network security gateway device.

17. The non-transitory computer-readable storage medium of claim 15, wherein the method further comprises providing on behalf of the private network one or more of firewall functionality, Intrusion Prevention System (IPS) functionality, application control functionality, Virtual Private Networking (VPN) functionality and web content filtering functionality.

18. The non-transitory computer-readable storage medium of claim 15, wherein said enabling, by default, logging and archiving of the information to the cloud-based logging service is responsive to a determination by the network security gateway device that the network security gateway device does not have a local hard disk.

19. The non-transitory computer-readable storage medium of claim 15, wherein the method further comprises prompting the network administrator to register with the cloud-based logging service to obtain enhanced services beyond those of the basic level of logging and reporting services.

20. The non-transitory computer-readable storage medium of claim 15, wherein the cloud-based logging service is provided by a vendor of the network security gateway device.

* * * * *